US010880204B1

(12) United States Patent
Shalev et al.

(10) Patent No.: US 10,880,204 B1
(45) Date of Patent: Dec. 29, 2020

(54) LOW LATENCY ACCESS FOR STORAGE USING MULTIPLE PATHS

(71) Applicant: Amazon Technologies, Inc., Seattle, WA (US)

(72) Inventors: Leah Shalev, Zichron Yaakov (IL); Shyam Prasad Rajagopal, Bothell, WA (US); Norbert Paul Kusters, Redmond, WA (US); Alexander Matushevsky, Haifa (IL); Ehab Wattad, Jerusalem (IL); Saar Gross, Binyamina (IL)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 15/716,152

(22) Filed: Sep. 26, 2017

(51) Int. Cl.
| | |
|---|---|
| *G06F 15/16* | (2006.01) |
| *G06F 15/173* | (2006.01) |
| *H04L 12/707* | (2013.01) |
| *G06F 15/167* | (2006.01) |
| *H04L 29/08* | (2006.01) |
| *H04L 12/861* | (2013.01) |
| *H04L 29/06* | (2006.01) |
| *H04L 12/805* | (2013.01) |

(52) U.S. Cl.
CPC ............ *H04L 45/24* (2013.01); *G06F 15/167* (2013.01); *H04L 47/365* (2013.01); *H04L 49/9057* (2013.01); *H04L 67/1097* (2013.01); *H04L 69/166* (2013.01); *H04L 2212/00* (2013.01)

(58) Field of Classification Search
CPC ..... H04L 49/25; H04L 49/9057; H04L 45/24; H04L 47/11; H04L 47/365; H04L 67/1097; H04L 69/166; H04L 2212/00; G06F 15/167; G06F 15/173

USPC ........................................................ 709/212
See application file for complete search history.

(56) References Cited

U.S. PATENT DOCUMENTS

| | | | |
|---|---|---|---|
| 7,403,542 B1 * | 7/2008 | Thompson | H04L 69/16 370/389 |
| 2009/0046804 A1 * | 2/2009 | Yuan | G06F 13/385 375/295 |
| 2015/0172226 A1 * | 6/2015 | Borshteen | H04L 49/9057 370/412 |
| 2016/0085718 A1 * | 3/2016 | Huang | H04L 29/08 709/213 |

(Continued)

OTHER PUBLICATIONS

Don Parker, "Basic Journey of a Packet," Mar. 2010, symantec.com, web.archive.org/web/20100328222733/https://www.symantec.com/connect/articles/basic-journey-packet (Year: 2010).*

*Primary Examiner* — Ruolei Zong
(74) *Attorney, Agent, or Firm* — Weaver Austin Villeneuve & Sampson LLP

(57) ABSTRACT

Techniques for transferring data between a host system and a remote system over a network are disclosed. A large command with associated data to be transmitted is divided into segments. Each segment is encapsulated in a network transport unit that includes a corresponding segment identifier for the segment. The network transport units for the segments are then submitted for transmission between the host system and the remote system using multiple network paths. A system receiving the network transport units for the segments reassembles the command with associated data based on the corresponding segment identifiers in the network transport units.

17 Claims, 13 Drawing Sheets

(56) References Cited

U.S. PATENT DOCUMENTS

| | | | |
|---|---|---|---|
| 2016/0127492 A1* | 5/2016 | Malwankar | H04L 67/2842 |
| | | | 709/212 |
| 2017/0085485 A1* | 3/2017 | Vanini | H04L 47/762 |
| 2017/0286363 A1* | 10/2017 | Joshua | G06F 15/17331 |
| 2018/0032462 A1* | 2/2018 | Olarig | G06F 13/1668 |
| 2019/0058693 A1* | 2/2019 | Alkhabbaz | H04L 63/0245 |

* cited by examiner

| UDP/IP | RRD Header | imm_hdr | NVMr capsule with SQE and keyed SGL | iCRC |

| UDP/IP | RRD Header | imm_hdr | RDMA DATA | iCRC |

| UDP/IP | RRD Header | imm_hdr | NVMfr capsule with CQE | iCRC |

| UDP/IP | RRD Header | imm_hdr | NVMr capsule with data and SQE | iCRC |

| UDP/IP | RRD Header | imm_hdr | NVMr capsule with CQE | iCRC |

| Bytes | Field | Description |
|---|---|---|
| 0-1 | cmd_id | NVMe command ID |
| 2-3 | seg_id | sequence number of current segment |
| 4-5 | total_seg_num | total number of the segments in current command |
| 6-7 | | Reserved |

| Bytes | Field | Description |
|---|---|---|
| 0-1 | cmd_id | NVMe command ID |
| 2-3 | sqid | submission queue ID |
| 4-5 | seg_id | sequence number of current segment |
| 6-7 | total_seg_num | total number of the segments in current command |

LOW LATENCY ACCESS FOR STORAGE USING MULTIPLE PATHS

BACKGROUND

In network environments for high performance computing such as a data center or a storage area network, data traffic to and/or from one network node could be very heavy. High bandwidth and/or low latency across network-connected systems are generally desired in a high performance computing environment. Various high speed data connections and protocols are designed to handle the heavy data traffic. However, with ever increasing amount of data and thus bandwidth and throughput demand for the connections, even these high speed data connections may be overloaded, causing congestions and/or latency variations in the network.

BRIEF DESCRIPTION OF THE DRAWINGS

Various embodiments in accordance with the present disclosure will be described with reference to the drawings, in which:

FIG. 6A illustrates a part of an example read request packet that includes an NVMr capsule, according to certain aspects of the present disclosure;

FIG. 6B illustrates a part of an example RDMA write packet for data write using RDMA, according to certain aspects of the present disclosure;

FIG. 6C illustrates a part of an example read completion packet that includes an NVMf capsule, according to certain aspects of the present disclosure;

FIG. 7A illustrates a portion of an example write request packet with inline data, according to certain aspects of the present disclosure;

FIG. 7B illustrates a portion of an example write completion packet, according to certain aspects of the present disclosure;

FIG. 8 illustrates an example NVMr header for identifying a segment, according to certain aspects of the present disclosure;

DETAILED DESCRIPTION

Figure 1:
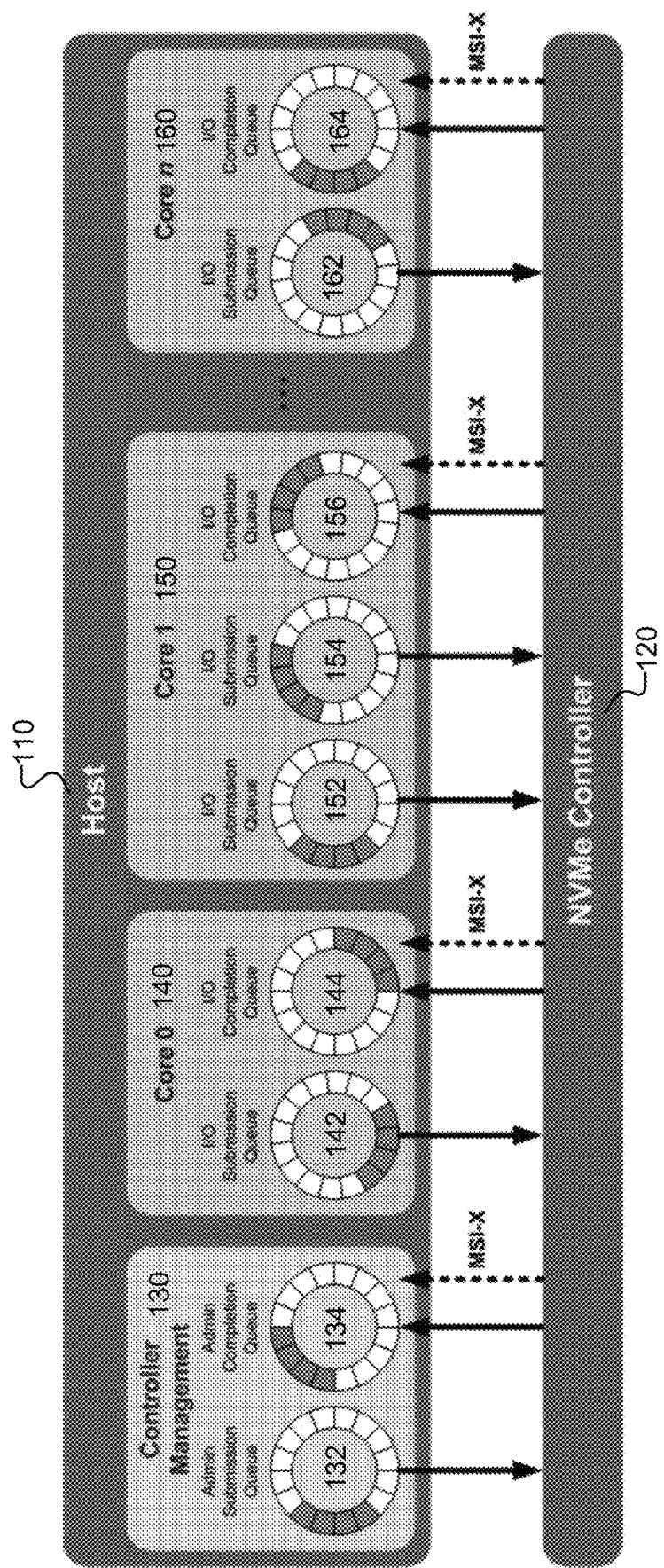
FIG. 1 illustrates an example Non-Volatile Memory Express (NVMe) queue architecture.

Embodiments of the present disclosure provide methods and systems for high speed data transports in a network environment. Transport datagrams can be used over network fabrics with a high bandwidth, a low and consistent latency, and a kernel-bypassing operation for applications, such as data center, storage area network (SAN), or distributed memory caching system (e.g., memcached).

Techniques disclosed herein generally relate to low-latency access for storage. In some embodiments, the techniques may be used to transport data associated with a command between a host system and a remote system with a low and consistent latency. The data associated with a command may be divided into multiple segments and the multiple segments may be transported through multiple paths between the host system and the remote system. In one example, the techniques may be used for data transfer using Non-Volatile Memory Express (NVMe) over Fabrics through relaxed reliable datagram (RRD) transport. In NVMe over Fabrics (NVMf) using remote direct memory access (RDMA) transport, RDMA transport may guarantee that packets are delivered in-order, but may cause a large variation in latency or a high packet drop rate. RRD transport may use all available network paths to deliver packets for a same flow (endpoint-to-endpoint) for load balancing, and does not enforce in-order delivery (e.g., by dropping out-of-order packets). Thus, high bandwidth data transfer with a low and consistent latency performance may be achieved using RRD transport.

In some embodiments, a large command (e.g., NVMf command) with associated data may be divided into segments. Each segment may be sent in a packet that includes the corresponding segment identifier and the total number of segments for the command with associated data. As such, even if the packets are delivered out-of-order (e.g., because they are delivered on different network paths or ports), a receiving system may know the expected number of packets associated with the command, and may, after receiving the expected number of packets associated with the command, reassemble the command with associated data based on the segment identifiers in the packets.

As used herein, a flow or a data flow generally refers to a stream of associated data packets, in some cases, traversing the network in order. A user application on a source endpoint may desire to send a user application data stream to a destination endpoint through a network. The data may be one or more messages, one or more commands, or one or more transactions. In some cases, the source endpoint and the destination endpoint may each have a unique IP address. In such cases, a user application data stream intended to be transferred from a source IP address to a destination IP address in a single TCP or UDP connection may be referred to as a data flow or a flow. In some other cases, multiple endpoints may share an IP address, and user application data streams between endpoints can thus be multiplexed in an IP-level data stream between a pair of source and destination IP addresses. In these cases, user application data streams from the multiple endpoints intended to be transferred from a source IP address to a destination IP address in a single TCP or UDP connection may be referred to as a data flow or a flow, where the source IP address is shared by multiple endpoints. In some other cases, an endpoint may have multiple IP addresses and a user application data stream may be intended to be sent through multiple paths using the multiple IP address. In these cases, each part of the user application data stream, which is intended to be transferred from a source IP address to a destination IP address in a single TCP or UDP connection, may be referred to as a data flow or a flow.

As also used herein, a path generally refers to a route that a data packet takes through a network between two IP addresses. A flowlet generally refers to a group of packets associated with a data flow transferred on a unidirectional (half-duplex) connection between two network interfaces.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Non-Volatile Memory Express is a logical device interface protocol for accessing non-volatile memory (NVM), including NAND flash memory and next-generation NVM memory in the form of solid-state drives (SSDs), attached via a PCI Express (PCIe) bus, to take advantages of the low latency and internal parallelism of flash-based storage devices. As such, it does not have some of the limitations that some storage protocols designed for hard disk drives may have. For example, NVMe protocol supports multiple deep queues, which is an advancement over traditional Serial Attached SCSI (SAS) and Serial Advanced Technology Attachment (SATA) protocols. Each queue of these queues is designed such that I/O commands in the queue and responses to these commands may operate on a same processor core, and can take advantage of the parallel processing capabilities of multi-core processors. Thus, each application or thread may have its own independent queue, and hence no I/O locking may be required. In addition, NVMe has a streamlined and simple command set that uses less than half of the number of CPU instructions used by SAS or SATA to process an I/O request, and thus may provide a higher Input/output operations per second (IOPS) per CPU instruction cycle and a lower I/O latency in the host software stack.

FIG. 1 illustrates an example NVMe queue architecture. As shown in FIG. 1, NVMe protocol is based on a paired Submission and Completion Queue mechanism. Commands may be placed by host software on a host 110 into a Submission Queue. Completions may be placed into a corresponding Completion Queue by an NVMe controller 120. Multiple Submission Queues may utilize a same Completion Queue. Submission and Completion Queues may be allocated in memory.

An Admin Submission Queue 132 and an associated Completion queue 134 may be used by controller management and control module 130 (e.g., to create or delete I/O Submission and Completion Queues, to abort commands, etc.). Only commands that are part of an Admin Command Set may be submitted to Admin Submission Queue 132.

The host software may create queues, up to the maximum number of queues supported by NVMe controller 120. The number of queue pairs created may be based on the system configuration and anticipated workload. For example, on an n-core-processor-based system, there may be a queue pair (QP) per core to avoid I/O locking and to ensure that data structures are created in the appropriate processor core's cache. In the example shown in FIG. 1, an I/O Submission Queue 142 and an I/O Completion Queue 144 may be created for core 0 (140), and an I/O Submission Queue 162 and an I/O Completion Queue 164 may be created for core n (160). In some cases, multiple I/O Submission Queues may utilize a same I/O Completion Queue on a core. For example, in the example shown in FIG. 1, an I/O Submission Queue 152, an I/O Submission Queue 154, and an I/O Completion Queue 156 shared by I/O Submission Queues 152 and 154, may be created for core 1 (150). An I/O Command Set (NVM Command Set) may be used for the I/O queue pairs.

A Submission Queue (SQ) may be a circular buffer with a fixed slot size that the host software uses to submit commands for execution by a controller. The host software may update an appropriate SQ Tail doorbell register when there are one to N new commands to execute. The previous SQ Tail value may be overwritten in the controller when there is a new doorbell register write. The controller may fetch SQ entries from the Submission Queue in order. However, the controller may execute those commands in any order.

Each Submission Queue entry may include a command. The command may be 64-byte in size. The physical memory locations in memory for data transfers may be specified using Physical Region Page (PRP) entries or Scatter Gather Lists (SGLs). Each command may include two PRP entries or one SGL segment. If more than two PRP entries are needed to describe the data buffer, then a pointer to a PRP list that describes a list of PRP entries may be provided. If more than one SGL segment is needed to describe the data buffer, the SGL segment may provide a pointer to the next SGL segment.

A Completion Queue (CQ) may also be a circular buffer with a fixed slot size used to post status for completed commands. A completed command may be uniquely identified by a combination of the associated SQ identifier, and the command identifier that is assigned by host software. Multiple Submission Queues may be associated with a single Completion Queue as shown in Core 1 in FIG. 1. This feature may be used when a single thread processes all command completions via one Completion Queue even when the commands are originated from multiple Submission Queues.

As shown in FIG. 1, NVMe protocol may also support Message-Signaled Interrupts Extended (MSI-X) and interrupt steering, which may prevent bottlenecking at the CPU level and enable massive scalability as systems expand.

An NVMe interface may be optimized for solid state drives, and may typically be attached as a register level interface to the PCI Express interface. To access data storage over a network, for example, to access a server from a client through TCP/IP or to access the storage (disks) over a network by different servers in a storage area network, there might be several methods for efficient access to data storage over a network. One method is to encapsulate storage commands and data over TCP/IP (e.g., using Internet Small Computer System Interface (iSCSI) or iSCSI Extensions for RDMA (iSER) protocol). Another method is to access data storage over Remote Direct Memory Access (RDMA) fabric, such as, for example, InfiniBand, RDMA over Ethernet (RoCE), or Internet Wide Area RDMA Protocol (iWARP).

NVMe over Fabrics (NVMf) is an extension to NVMe that enables the use of alternate transports to PCIe to extend the distance over which an NVMe host device and an NVMe storage drive or subsystem may connect. A fabric (or network fabric) generally refers to a network topology in which nodes pass data to each other through interconnecting switches. A goal for NVMe over Fabrics is to add no more than 10 microseconds of latency between an NVMe host and a remote NVMe storage device connected through an appropriate network fabric, compared with the latency of an NVMe storage device using a local server's PCIe bus. NVMe over Fabrics may work with any suitable storage fabric technology, including NVMe over Fabrics using Fiber Channel (FC-NVMe) and NVMe over Fabrics using RDMA. NVMe over Fabrics using RDMA may use any RDMA technology, such as, for example, RoCE, iWARP for Ethernet, and InfiniBand.

RDMA protocol has been used extensively for storage, for example, for front-access to a storage controller, for access to backend disks, or for distributed caching and/or clustering within distributed storage controllers. RDMA allows one machine to access memory on another machine over a network without involving the remote CPU. Most RDMA service types provide in-order delivery even if the delivery may not be guaranteed.

Figure 2:
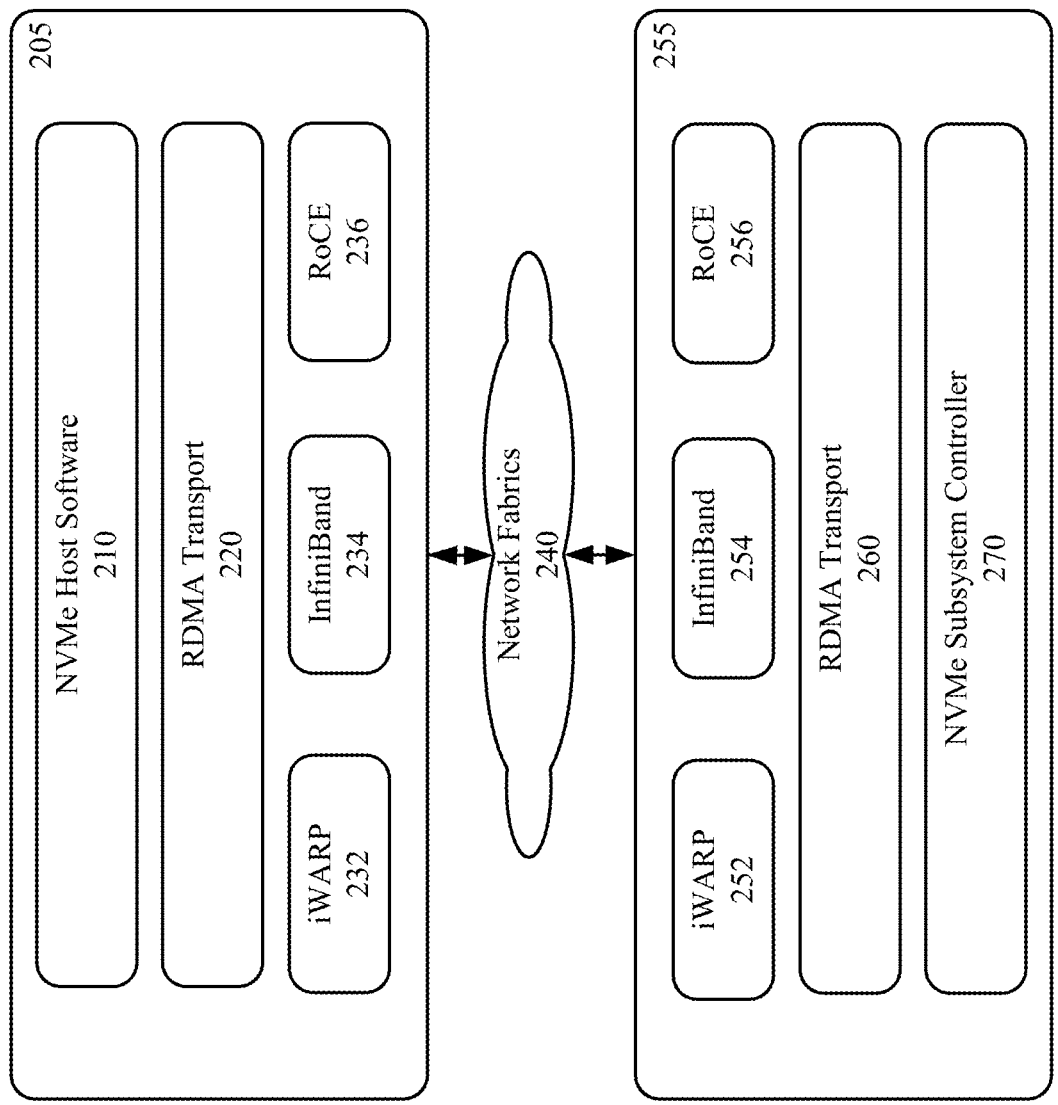
FIG. 2 illustrates the layering of NVMe over Fabrics using Remote Direct Memory Access (RDMA) Transport within a host and a Non-Volatile Memory (NVM) subsystem.

FIG. 2 illustrates the layering of NVMe over Fabrics using RDMA Transport within a host 205 and an NVM subsystem 255. On host 205, host software 210 may place commands into a Submission Queue for execution by NVM subsystem 255. An RDMA Transport 220 may provide reliable in-order capsule delivery and direct data placement (DDP) of Admin and I/O command data using the RDMA reliable QP modes (e.g., Reliable Connection (RC) or Reliable Datagram (RD)). RDMA Transport 220 may use a common set of RDMA operations to facilitate the exchange of command capsules, response capsules, and data, where a capsule is an NVMe unit of information exchange used in NVMe over Fabrics. The capsules may be transported over an RDMA fabrics 240 using one of an iWARP interface 232, an InfiniBand Interface 234, an RoCE interface 236, or other next generation fabric interfaces.

On NVM subsystem 255, an NVMe subsystem controller 270 may execute the commands and place Completions into the associated Completion Queue, through an RDMA transport 260. As RDMA Transport 220, RDMA transport 260 may use the common set of RDMA operations, for example, to facilitate the exchange of command capsules, response capsules, and data over RDMA fabrics 240 using one of an iWARP interface 252, an InfiniBand Interface 254, an RoCE interface 256, or other next generation fabric interfaces.

Compared with NVMe, extensions supported by NVMe over Fabrics may include, for example, the use of capsules for commands, responses, and optionally for data transfers. A capsule may include a command or response, and may optionally include command/response data and SGLs. Other extensions supported by NVMe over Fabrics may include, for example, the extension of SGLs to support in-capsule data and NVMe Transports that utilize a key/offset memory addressing architecture.

NVMe over Fabrics has several differences from the NVMe base specification. For example, in NVMe over Fabrics, there is a one-to-one mapping between I/O Submission Queues and I/O Completion Queues. NVMe over Fabrics does not support multiple I/O Submission Queues being mapped to a single I/O Completion Queue as shown in Core 1 150 of FIG. 1. In NVMe over Fabrics, queues are created using a Fabrics command "Connect." NVMe over Fabrics does not support PRPs, and may use SGLs for Admin, I/O, and Fabrics commands. NVMe over Fabrics does not support Completion Queue flow control. This may require that the host ensures that there are available Completion Queue slots before submitting new commands.

As discussed previously, in a typical computer cluster system, there may be multiple paths that packets can take to travel across the network from a source system to a destination system. A stream of packets from one source to one destination may be called a flow of packets or, more simply, a flow. The packets in a flow may be related to each other (e.g., they belong to one continuous stream of data, such as a video or a conversation), and a flow may end and restart (e.g., the video or conversation may end, and a new one may begin). Greater efficiency across the cluster may be achieved when packets from a given source to a specific destination are spread across all available paths. Existing transport services are typically designed for in-order packet delivery, and may be configured to send one flow over only one path to ensure the probability of in-order packet arrival and to reduce performance degradation. Furthermore, these transport services may only be able to change paths after one flow ends.

In many cases, guaranteeing packet ordering may include either keeping state for all QP-to-QP flows, which is not easily scalable, or serialization of packets belonging to different logical flows into a single sequence of packets, which may create false dependency between unrelated flows and thus increase the average and maximum latency. Relaxed Reliable Datagram (RRD) is a type of transport service with unreliable datagram (UD)-like interface and transparent recovery from packet loss, but does not guarantee packet ordering. Relaxed Reliable Datagram (RRD) may provide scalability and guaranteed packet delivery in networks where packet drops are not rare events. In some embodiments, Relaxed Reliable Datagram may provide user applications with a simple, connectionless interface that is similar to Unreliable Datagram. Relaxed Reliable Datagram guarantees packet delivery. Relaxed Reliable Datagram does not necessarily deliver packets in order, and thus may simplify the transport design and potentially increase the efficiency of packet delivery.

RRD transport may send packets over all available paths for load balancing, while maintaining up-to-date information about congested or faulty paths. An RRD context for a specific destination may include multiple unidirectional flowlet contexts, where each flowlet may use a different path. For example, each flowlet context may include a source User Datagram Protocol (UDP) port field used in the outer header, where a different source UDP port may be associated with a different path. Each flowlet may be associated with a different path that can be re-assigned in case of timeout or excessive packet loss. RRD state may be arranged on a per-path basis, where packets sent to a particular destination on a particular path may have a separate context and independent packet numbering. Packet sequence numbers can be tracked independently on each flowlet.

A flowlet may be invisible to user applications. The packets in a flowlet may carry a flowlet index and a packet sequence number. The packet sequence numbers may be relative to the flowlet. The source endpoint maintains information on the outstanding unacknowledged packets, including information necessary for retransmit. The destination endpoint may recover the flowlet index or the packet sequence number from a received packet in, for example, the header of the packet, and send an acknowledgement of receiving the packet to the source endpoint. The source endpoint may then remove the sequence number of the packet after the acknowledgement of receiving the packet is received from the destination endpoint. The source endpoints may also remove the sequence number of a packet after the packet has been sent.

Each flowlet may be controlled to have a limited number of outstanding transmit packets. Therefore, slower paths may be used less frequently than faster paths when choosing a flowlet. A flowlet can be either in an active state (i.e., having outstanding unacknowledged packets) or an idle state (everything is acknowledged).

In general, packets are transmitted on the same path for a given active flowlet. In some embodiments, a transmitter may change the path randomly when packets are assigned to an idle flowlet. The transmitter can also reassign a flowlet to a different path after a timeout, or when experiencing excessive latency or excessive packet drops.

On the receive side, a destination context may keep the sequence number of the last in-order packet and sequence numbers of out-of-order packets, but it may not keep any endpoint buffer information. All arriving non-duplicate packets may be delivered to the next level of RRD service. The destination context may generate regular acknowledge to acknowledge in-order packets, and selective acknowledge packets to report any holes in the received packets sequence.

Flowlets within a particular RRD context may be numbered using indices. Flowlet index may be specified in the packet header. A same index may be used in both directions for sending flowlet context on one side and for the corresponding receive flowlet context on the other side. The maximum number of flowlets per RRD context may be predetermined and hardcoded, or it may be negotiated and adjusted before or during the communication.

Compared to transport services that guarantee packet ordering, such as Reliable Connection and Reliable Datagram, a system using Relaxed Reliable Datagram transport may provide better scalability and better latency, and thus possibly better performance for high performance computing applications. For example, transport services that guarantee packet order may require that a network adapter device buffer a certain amount of packets and then re-order them before providing them to the host device. In some cases, when packets arrive out of order, the network adapter device may need to drop all out-of-order packets in a flow and request that the packets be resent.

In contrast, with Relaxed Reliable Datagram transport, the packets may only be buffered for a minimal amount of time, thus possibly improving overall latency. Re-ordering operations may be conducted by software on the host device, where the software may make use of powerful host device processors at a minimal cost to latency. In some cases, the Relaxed Reliable Datagram transport may be made to guarantee ordering, but doing so may require either tracking packet order state for all flows from the transmit-side queue pairs to the receive-side queue pairs, or serializing packets that belong to different logical flows into a single sequence of packets, which may be difficult to scale, may create a false dependency between unrelated flows, and may increase the average and maximum packet transfer latency.

Due to these characteristics of RRD transport, it may be advantageous to use an NVMf over RRD transport protocol (NVMr) for high bandwidth data transport with a low and consistent latency. As discussed above, RRD transport is a reliable transport built on top of datagrams without ordering guarantees. RRD transport may detect and drop duplicate packets. RRD transport may spread packets across links and does congestion control. RRD transport may also support RDMA extended transport header (RETH) that can be used to specify the buffer address and transaction identification required for completing RDMA and/or direct data placement (DDP) operations. RRD transport may also validate the integrity of messages using, for example, a 32-bit iCRC.

Figure 3:
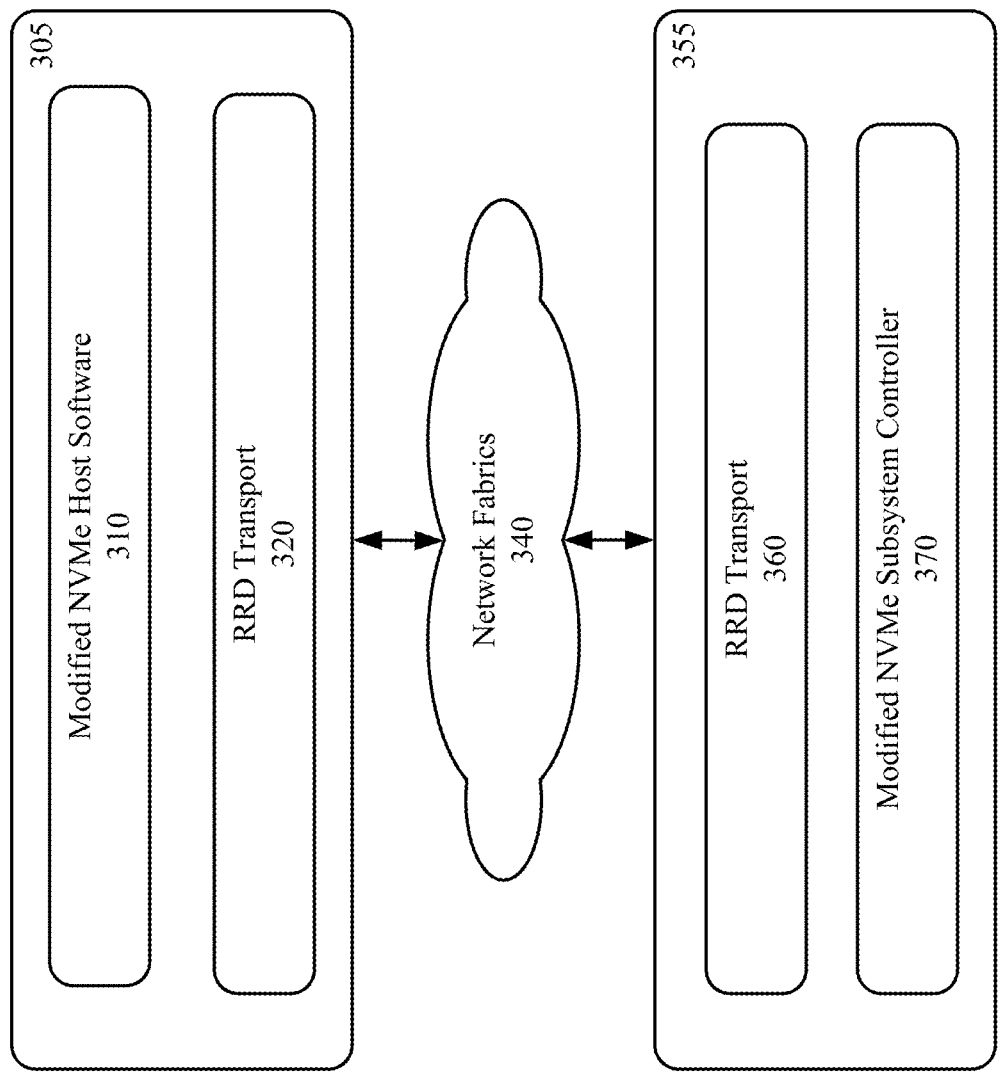
FIG. 3 illustrates the layering of NVMe over Fabrics (NVMf) using RRD Transport within a host and an NVM subsystem, according to certain aspects of the present disclosure.

FIG. 3 illustrates the layering of NVMe over Fabrics using RRD Transport within a host 305 and an NVM subsystem 355, according to certain aspects of the present disclosure. As in FIG. 2, on host 305, modified NVMe host software 310 may place commands into a Submission Queue for execution by NVM subsystem 355. An RRD Transport 320 may facilitate the reliable exchange of command capsules, response capsules, and data over network fabrics 340. The command capsules, response capsules, and data may be transmitted over multiple network paths through network fabrics 340, and may be delivery out of order at least in some cases.

On NVM subsystem 355, a modified NVMe subsystem controller 370 may execute the commands and place Completions into the associated Completion Queue, through an RRD transport 360. As RRD Transport 320, RRD Transport 360 may facilitate the reliable exchange of command capsules, response capsules, and data over network fabrics 340.

The NVMr protocol disclosed herein may comply with the NVMf specification for creating queues, data transfer, and RDMA operations, but may include some modifications or extensions due to some characteristics of RRD transport. An NVMf session is generally maintained between a host and a remote NVMf subsystem. It may continue across a loss of a transport connection, i.e., property/feature settings may be preserved even if a transport disconnect occurs. A single RRD transport context may be used for a particular NVMr session. As described above, a single RRD transport context may correspond to multiple flowlet contexts that may take different paths though the network fabric.

In addition, RRD protocol used in NVMf may not handle fragmentation when the size of a message is greater than the maximum transmission unit (MTU), which may be the largest size of a packet or frame that can be sent in a packet- or frame-based network, such as the Internet. To handle segmentation of messages greater than the MTU, an NVMr protocol may be used for supporting segmentation and reassembly of messages, such that a layer above the RRD (i.e., NVMr) may keep track of the different segments. Furthermore, RRD protocol does not guarantee in-order delivery, even for packets associated with a single I/O command. Therefore, segments from a single I/O command may be delivered out of order. The buffer flow control for RRD may be different from RDMA as well.

According to certain aspects of this disclosure, in NVMr transport, the segmentation of large message can be performed on a layer higher than the RRD transport layer, and the segmentation information for each segment (e.g., segment identifier or sequence identifier) can be included in a header other than the RRD header in a packet. As such, even if the segments are delivered out of order, the segments may be reassembled in order based on the segmentation information.

Figure 4:
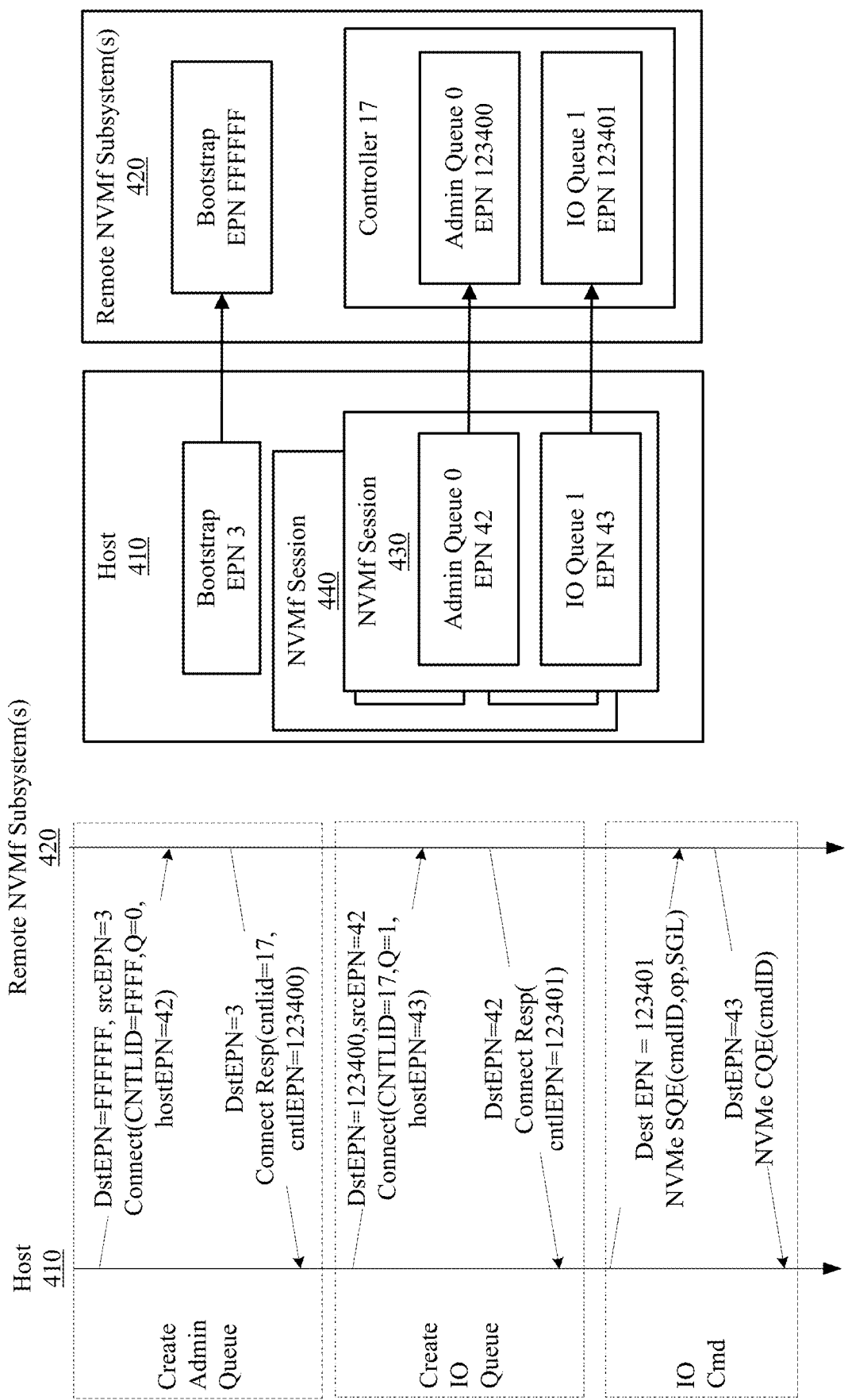
FIG. 4 illustrates examples of an NVMf transport session establishment and mapping to RRD endpoints, according to certain aspects of the present disclosure.

FIG. 4 illustrates examples of NVMf transport session establishment and mapping to RRD endpoints, according to certain aspects of the present disclosure. As described above, a logical NVMf transport session may be maintained between a host and a remote NVMf subsystem. It may continue even after a loss of a transport connection. All commands and completions may be sent using the transport session. Before the host can submit any I/O command, it may need to request the creation of the transport session (if one does not exist), associate with an NVMe controller, and request the creation of a submission queue and/or a completion queue. The RRD transport context may be initialized when a new remote NVMr subsystem is configured, and before starting the NVMr connect sequence.

In the example shown in FIG. 4, a host 410 may use a special "bootstrap" pseudo-controller identifier (ID) FFFF to attach to a controller in order to create an Admin Queue Pair (which may include an Admin Submission Queue and/or an Admin Completion Queue). For example, host 410 may use a source bootstrap endpoint number (EPN) 3, a special destination bootstrap EPN (e.g., FFFFFF), and a "connect" command that specifies the special bootstrap pseudo-controller ID (e.g., FFFF), a queue identifier (Q) (e.g., 0), and a host EPN (e.g., 42), to attach to remote NVMf subsystem(s) 420. Remote NVMf subsystem(s) 420 may return to host 410 with a response that identifies destination EPN 3 (which is the source bootstrap EPN that was sent with the "connect" command), an available controller (e.g., a controller with an identifier of 17), and the corresponding RRD endpoint number (e.g., controller EPN 123400) to create Admin Queue 0 (e.g., between host endpoint 42 and RRD endpoint 123400).

Admin Queue 0 and controller 17 may then be used to create one or more NVMf sessions 430, 440, etc. NVMf session establishment over RRD is slightly different from the regular connection-oriented NVMf mapping. In particular, on RRD level, there are no separate connections for each submission queue, just separate endpoint numbers (EPN). Unlike with traditional RDMA transports, EPNs are managed by an upper layer (NVMr) and not by RRD itself, and do not require multistep initialization (usually coordinated by an RDMA Connection Manager). For example, host 410 may place an Admin command in Admin Submission Queue 0 along with host EPN (e.g., 42) and RRD endpoint number (e.g., controller EPN 123400). The command may include the controller identifier (e.g., 17), the queue identifier (Q) (e.g., 1), and the host EPN (e.g., 43) for the NVMf session. In some implementations, the host's NVMe Qualified Name (NQN) may be passed as part of the connect command for use as the host's unique identifier. Remote NVMf subsystem(s) 420 may return to host 410 with a response that identifies destination EPN 42 (which is the source EPN that was sent with the connect command), and the corresponding RRD endpoint number (e.g., controller EPN 123401) to create an I/O Queue 1 (e.g., between host endpoint 43 and RRD endpoint 123401). Each controller may be accessed by a single host. Multiple hosts may access a same remote NVMe subsystem through multiple logical controllers. Each NVMf session may be uniquely identified by the RRD endpoint number (i.e., controller EPN).

After the I/O queue is established, I/O commands can be placed by host 410 or remote NVMf subsystem(s) 420 to I/O queue 1. For example, in the example shown in FIG. 4, host 410 may place a Submission Queue Entry (SQE) in I/O Submission Queue 1 along with the RRD endpoint number (e.g., controller EPN number 123401). The SQE may include, for example, the command identifier, opcode of the command to be executed, and/or data or SGL. The command identifier may be unique within an NVMf session. Note that once the transport connection is established, the controller identifier (e.g., 17), the queue identifier (e.g., 1), and the host EPN (e.g., 43) may not need to be included with an I/O command, as the RRD endpoint number (i.e., controller EPN) may uniquely identify the controller and the NVMe host that can access the controller because, as described above, each controller may be accessed by a single host. The controller ID (e.g., 17) may be explicitly included in the NVMr command for connect command. For other commands, the controller ID may be inferred implicitly from the network transport information (e.g., controller EPN). The controller on remote NVMf subsystem(s) 420 may then respond by placing a Completion Queue Entry in the I/O Completion Queue for I/O Queue 1, along with the host EPN.

As described above, the commands and completions (responses) may be exchanged over RDMA fabrics using capsules. A capsule may include a command or response, and may optionally include command/response data and SGLs. A capsule may be independent of any underlying NVMe Transport unit (e.g., packet, message, or frame and associated headers or footers) and may include multiple NVMe Transport units.

Figure 5A:
FIG. 5A illustrates an example format of an NVMf command capsule, according to certain aspects of the present disclosure.

FIG. 5A illustrates an example format of an NVMf command capsule 500, such as an NVMf I/O command, Admin command, or Fabric command, according to certain aspects of the present disclosure. Command capsule 500 may include a 64-byte Submission Queue Entry (SQE) field and a data or SGL field. The SQE field in a command capsule may include an NVMe I/O command (e.g., write, read, or flush), an NVMe Admin command (e.g., identify, keep alive, Advanced Error Reporting (AER), or abort), and a fabric command (e.g., connect, create queues, etc.). The SQE field may include a Command Identifier (CID) that specifies a unique identifier for the command when combined with the Submission Queue identifier. The SQE field may also include an Opcode field that specifies the opcode of the command to be executed.

If data is sent inline with the command/completion, the data may be sent after the submission queue entry (SQE) and/or completion queue entry (CQE) at an offset determined based on the value of the in-capsule data offset (ICDOFF) field that can be determined using an identify command. Thus, in some implementations, command capsule 500 may include an undefined field between the SQE field and the data or SGL field if the in-capsule data offset (ICDOFF) is greater than zero, because the data or SGL field may start after, for example, ICDOFF*16+64 bytes, while the SQE field ends at packet 63. If the data is sent or requested over RDMA, then it may be sent as a SGL. The first SGL descriptor can be specified in the SQE. If there is more than one SGL descriptor, then the remaining entries may be sent after the SQE.

Figure 5B:
FIG. 5B illustrates an example format of an NVMf response capsule, according to certain aspects of the present disclosure.

FIG. 5B illustrates an example format of an NVMe response capsule 550, according to certain aspects of the present disclosure. A response capsule may be sent from the NVM subsystem to the host in response to a command sent from the host system to the NVM subsystem. Response capsule 550 may include a Completion Queue Entry (CQE) and may optionally include data. The CQE is the completion entry associated with a previously issued command capsule. The CQE field in a command capsule may include 16 bytes and may include a Command Identifier (CID) that indicates the identifier of the command that is being completed. The CQE field may also include a Status Field (SF) that can indicate the status of the command that is being completed.

If a command requests data and the SGL in the associated command capsule specifies a Data Block descriptor with an offset, the data may be included in the response capsule. If the SGL(s) in the command capsule specify a region in host memory, then data is transferred via memory transactions. If the data is sent inline with the completion, the data may be sent after the CQE at an offset determined based on the value of the in-capsule data offset (ICDOFF) field that can be determined using an identify command. Thus, in some implementations, response capsule 550 may include an undefined field between the CQE field and the data field if the in-capsule data offset (ICDOFF) is greater than zero.

RRD protocol may support two broad categories of operations/packets—MSG (non-RDMA) and RDMA, and both of these can include an immediate header that is application specific. Additional application-specific headers may be added to the MSG packets, but not to the RDMA packets. The following figures show the full picture of headers, capsules, and data or SGL included in some example packets.

FIG. 6A illustrates a part of an example read request packet 610 that includes an NVMr capsule, according to certain aspects of the present disclosure. Read request packet 610 may include a UDP/IP header, an RRD header, an immediate header, an NVMr capsule with SQE and SGL as described above with respect to FIG. 5A, and an iCRC for data integrity verification. Read request packet 610 may be used, for example, by a host to read data from a remote subsystem.

FIG. 6B illustrates a part of an example RDMA write packet 620 for data write using RDMA, according to certain aspects of the present disclosure. RDMA write packet 620 may include a UDP/IP header, an RRD header, an immediate header, RDMA data, and an iCRC for data integrity verification. RDMA write packet 620 may be used, for example, by a remote subsystem to send data in separate RDMA write operations using the address and tag (i.e., rkey) from the SGL, in response to a read command.

FIG. 6C illustrates a part of an example read completion packet 630 that includes an NVMr capsule, according to certain aspects of the present disclosure. Read completion packet 630 may include a UDP/IP header, an RRD header, an immediate header, an NVMr capsule with CQE as described above with respect to FIG. 5B, and an iCRC for data integrity verification. Read completion packet 630 may be used, for example, by the remote subsystem to send the Completion Queue Entry after sending the requested data.

To read by a host from a remote subsystem, the host may send Submission Queue Entry along with RDMA keyed SGL using, for example, read request packet 610. The remote subsystem, upon receiving the request, may create one buffer for each SGL entry, and send each buffer using, for example, RDMA write packet 620. After sending the last buffer, the remote subsystem may send the Completion Queue Entry using, for example, read completion packet 630. The remote subsystem may send all these packets asynchronously, and it may be the host's responsibility for making sure that it has received all RDMA and Completion packets before the completion of the I/O command.

FIG. 7A illustrates a portion of an example write request packet 700 with inline data, according to certain aspects of the present disclosure. Write request packet 700 may include a UDP/IP header, an RRD header, an immediate header, an NVMr capsule with SQE and data as described above with respect to FIG. 5A, and an iCRC for data integrity verification. Write request packet 700 may be used, for example, by a host to write data to a remote subsystem.

FIG. 7B illustrates a portion of an example write completion packet 750, according to certain aspects of the present disclosure. Write completion packet 750 may include a UDP/IP header, an RRD header, an immediate header, an NVMr capsule with CQE as described above with respect to FIG. 5B, and an iCRC for data integrity verification. Write completion packet 750 may be used, for example, by the remote subsystem to send the CQE to the host.

In a write operation, a host may submit WRITE commands along with the data in the capsule using, for example, write request packet 700. It may be the remote subsystem's responsibility to track the command segments. Once the remote subsystem receives all the fragments, it may process them (e.g., perform the command) and send a completion response (e.g., using a response capsule) to the host using, for example, write completion packet 750.

As described above, capsules longer than a MTU may need to be segmented before transmission over RRD. For example, RRD packets may be limited to, for example, about 4.5 KB (4 KB data). Therefore, segmentation may be used to support bigger data buffers writes (e.g., 256 KB). However, RRD may not support segmentation and may not guarantee in-order delivery. In certain embodiments, the segmentation may be done on another layer above the RRD transport layer. The segmentation information may be included in a header other than the RRD header in the packet.

As shown in FIGS. 6A-6C and 7A-7B, all RRD packets, both RDMA and non-RDMA operations, each include an immediate header of, for example, 5-bytes, which may be used to identify a command and the segment of the command in the RRD transport.

FIG. 8 illustrates an example NVMr header 800 for identifying a segment of a command, according to certain aspects of the present disclosure. The cmd-id field represents the NVMe command identifier, which identified the command in a Submission Queue. The seg_id field indicates the sequence number of the current segment, which may be 0-based. The total_seg_num field may indicate the total number of segments in current command. A receiver of the command may use the total number of segments in the current command to allocate memory space on the receiver. The receiver of the command may also use the total number of segments in the current command to determine whether all segments in the current command have been received.

Figures 9A, 9B:
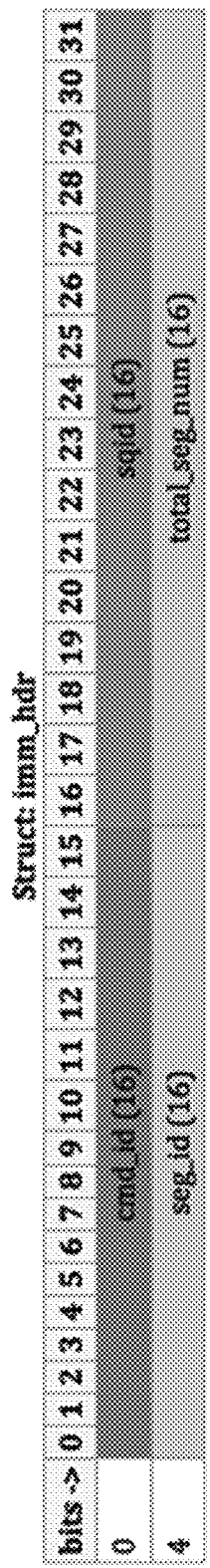
FIG. 9A illustrates the format of an example NVMr header that can be used to identify a queue and a segment, according to certain aspects of the present disclosure.
FIG. 9B is a table describing an example NVMr header that can be used to identify a queue and a segment, according to certain aspects of the present disclosure.

FIG. 9A illustrates the format of an example NVMr header 900 that can be used to identify a queue and a segment, according to certain aspects of the present disclosure. FIG. 9B is a table describing example NVMr header 900 that can be used to identify a queue and a segment, according to certain aspects of the present disclosure. As in FIG. 8, the cmd-id field represents the NVMe command identifier within the Submission Queue. The seg_id field indicates the sequence number of the current segment, which may be 0-based. The total_seg_num field may indicate the total number of segments in the current command. In some cases, NVMr header 900 may also include a sqid field to identify the submission queue to which the command is submitted to.

In a system using NVMr for data transfer, on an initiator (transmit) side, there may be no unsolicited data, and thus the initiator may always guarantee that the amount of receiving buffers is sufficient for all pending responses. For example, the initiator may not send new read requests when it is low on free memory in the buffer. Buffer management on the target (receive) side may be more challenging because the initiators can send unsolicited data to the target. If the backend storage write speed is lower than the network speed, the buffer on the target may be filled quickly, and bursts of write commands from multiple initiators may cause a significant amount of packet drops at the target. Several techniques may be used to avoid buffer depletion on the target and/or to allow the target to pre-post a sufficiently large buffer for each queue.

In one implementation, if the amount of data to write is small, the data may be sent inline with the command. If the amount of data to write is large, the data may be handled using target-originated RDMA read (e.g., read request packet 610) once the target allocates the required amount of memory. The initiator may then respond by writing data to the target using RDMA (e.g., using RDMA write packet 620).

In one implementation, the target may send assigned buffer credits to the initiator. For example, the target may reserve minimum buffer credits for each initiator, and may then manage additional buffer credits dynamically. A initiator may, for example, reduce or stop new write requests when it is low on buffer credits.

In another implementation, no explicit credits may be used. Rather, the target may generate, for example, "ReceiverNotReady" negative acknowledges (NAKs), when it is low on free buffer space. The initiators may respond to the NAKs by, for example, reducing or stopping new write requests (until the next I/O completion is received). In some cases, an initiator may stop transmitting if it has over a threshold number of outstanding commands already delivered to target. In some cases, the target may reserve a small buffer space for each connection, such as a buffer space of the maximum size of a single atomic write.

Figure 10:
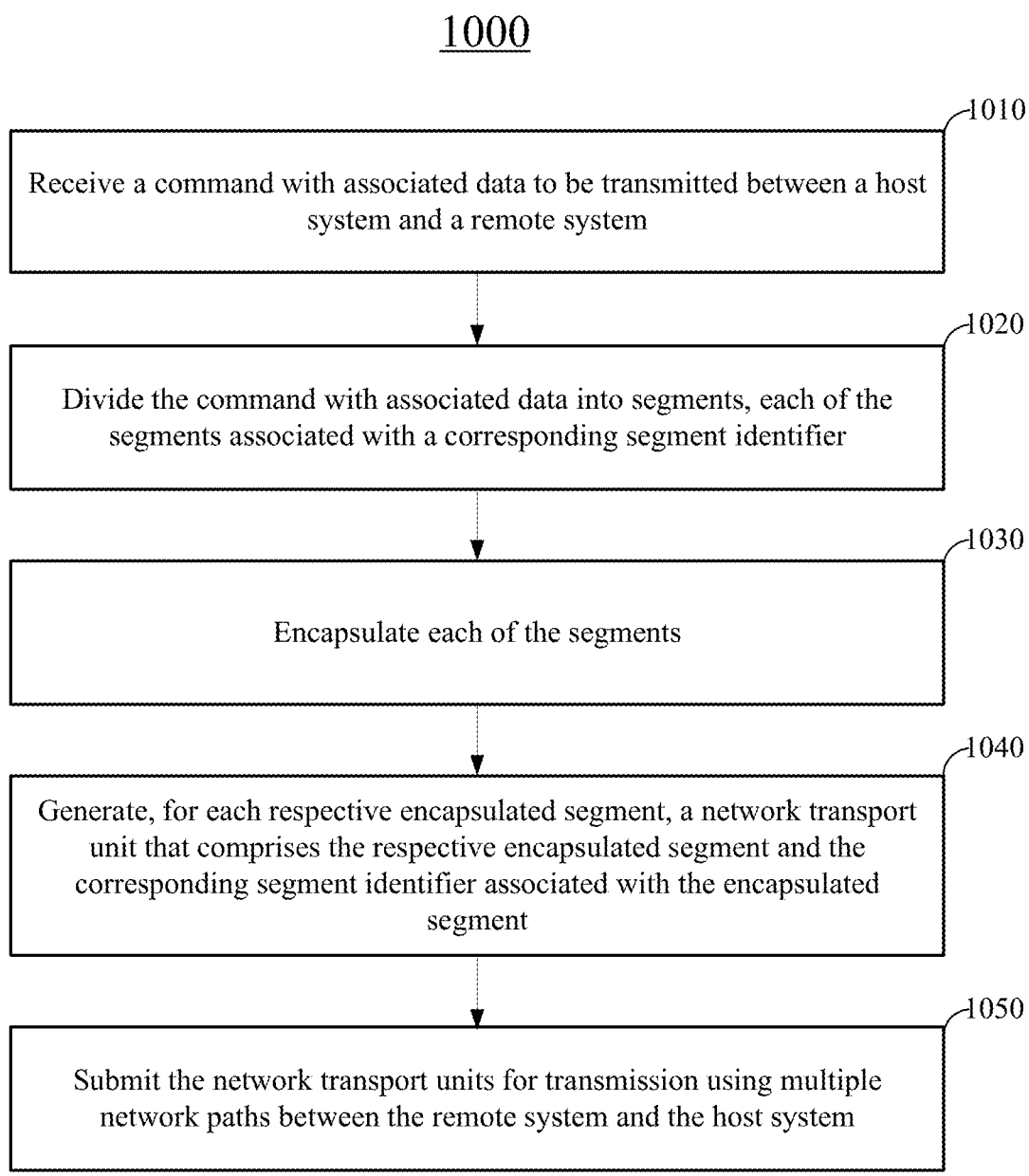
FIG. 10 is a flow chart illustrating an example method for transferring data between a host system and a remote system over a network, according to certain aspects of the present disclosure.

FIG. 10 is a flow chart 1000 illustrating an example method for transferring data between a host system and a remote system over a network, according to certain aspect of the present disclosure. The method may be implemented by the systems described above with respect to, for example, FIGS. 3-4. The method may be performed by, for example, an NVMe driver, including a software, a firmware, a hardware, or any combination thereof, on a host system. For example, the method may be performed by a modified NVMe host software or driver. The method may be performed after an NVMr transport session has been established between the host system and the remote system, and after an I/O queue pair has been created for the NVMr transport session, as described above with respect to FIG. 4.

At block 1010, at least a part of a host driver (e.g., an NVMe host driver), which may include a software, a firmware, a hardware, or any combination thereof, may receive a command (e.g., an NVMf command) with associated data to be transmitted to the remote system. In some embodiments, the command and data may be generated by the host driver based on a request from a user application running on or off the host system. The command with associated data may be placed in an I/O Submission Queue of the I/O queue pair as described above. The command may include, for example, a write command to write data to the remote system or a command to read data from the remote system.

At block 1020, because the size of the command with associated data may be larger than the size of the largest packet or frame that can be sent in a packet- or frame-based network (i.e., MTU), the command with associated data may need to be divided into segments, such that each segment is not larger than the MTU. For example, in a write command with inline data, the size of the data may be much larger than the MTU. Thus, the write command with the inline data may need to be divided into multiple segments. A different segment identifier may be assigned to each corresponding segment of the segments for the command with associated data. Each segment identifier may be unique within all segments for an command with associated data.

At block 1030, each of the segments may be encapsulated, for example, in a respective NVMf capsule. As described above with respect to, for example, FIG. 5A, the capsule may include an SQE field and a data field. The SQE field may include a Command Identifier (CID) that may specifies a unique identifier for the command when combined with a Submission Queue identifier. The SQE field may also include an Opcode field that specifies the opcode of the command to be executed.

At block 1040, for each encapsulated segment (e.g., NVMf capsule), a network transport unit may be generated. The network transport unit may be, for example, a packet, a message, or a frame, and may include the encapsulated segment and the corresponding segment identifier associated with the encapsulated segment. In some implementations, the segment identifier may be in an immediate header of an IP packet. In some implementations, the network transport unit may also include an RRD header. In some implementations, the network transport unit (e.g., RDMA write packet 620) may include RDMA data rather than an NVMf capsule.

At block 1050, the network transport units for the encapsulated segments may be submitted for transmission to the remote system using multiple network paths. For example, the network transport units may be put in a queue, submitted to an RRD transport context, and assigned to a different flowlet for transmitting through the network on different paths.

The network transport units may be guaranteed to be delivered to the remote system, but may be delivered to the remote system out-of-order in some cases. For example, a network transport unit that includes the first segment of the NVMf command with associated data may be received by the remote system after a network transport unit that includes the last segment of the NVMf command with associated data. The remote system may wait until all segments associated with the NVMf command are received, and then reassemble the segments to recover the NVMf command with associated data.

Figure 11:
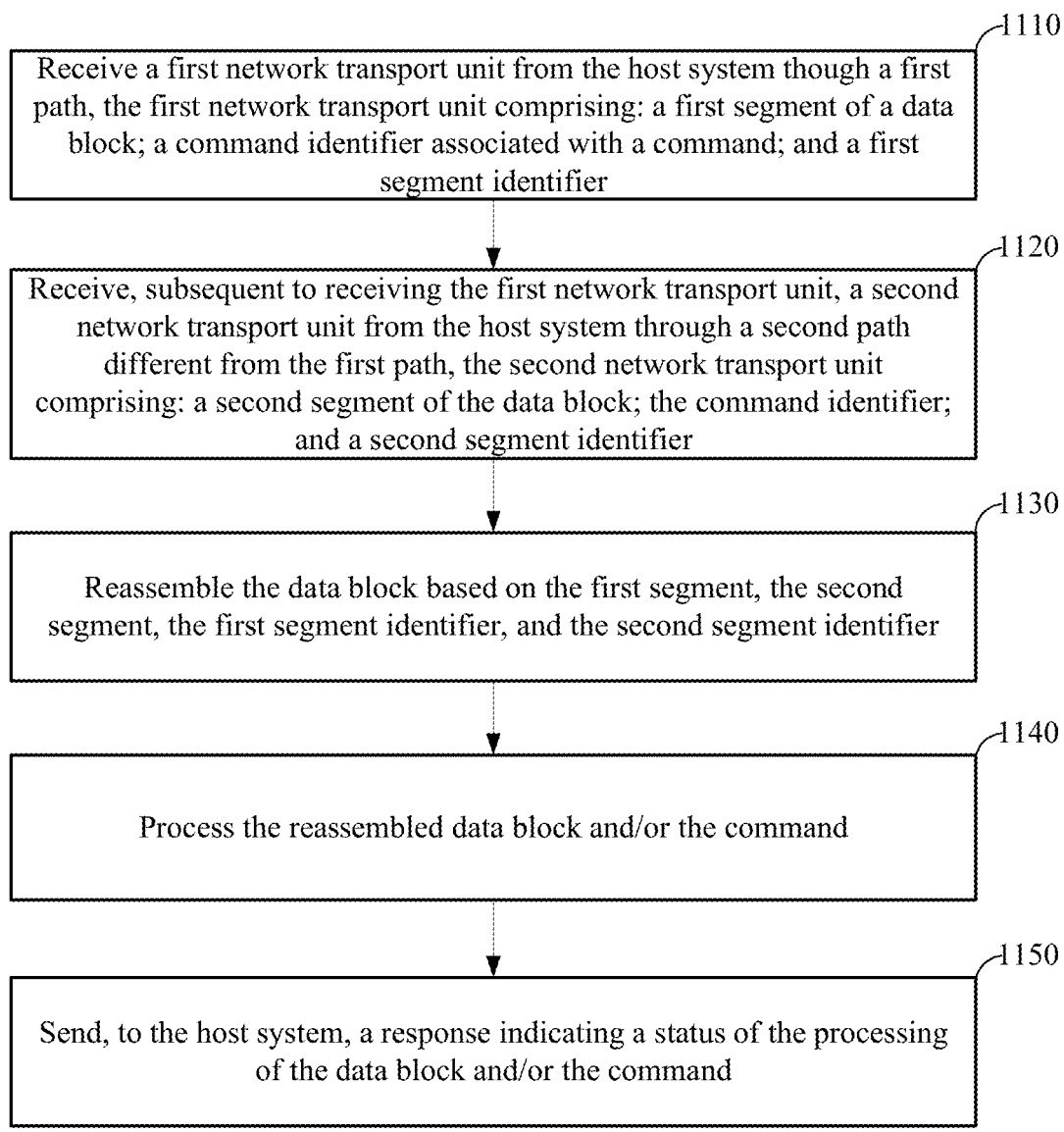
FIG. 11 is a flow chart illustrating an example method for transferring data between a host system and a remote system over a network, according to certain aspects of the present disclosure.

FIG. 11 is a flow chart 1100 illustrating an example method for transferring data between a host system and a remote system over a network, according to certain aspect of the present disclosure. In some embodiments, the method may be implemented by the systems described above with respect to, for example, FIGS. 3-4. For example, the method may be performed by an NVMe driver including a software, a firmware, a hardware, or any combination thereof, on a remote system. For example, the method may be performed by a modified NVMe driver or NVMe controller. The method may be performed after an NVMr transport session has been established between the host system and the remote system, and after an I/O queue pair has been created for the NVMr transport session, as described above with respect to FIG. 4.

At block 1110, the remote system may receive a first network transport unit from the host system, for example, through a first network path or a first network port. The first network transport unit may include a first segment of a data block, such as a write command (e.g., an NVMf write command) with associated data or a data block for an RDMA write operation in response to a read command, a command identifier associated with a command (e.g., the write command), and a first segment identifier associated with the first segment. As described above, an NVMf command may include an SQE field and a data field. The SQE field may include an Opcode field that specifies the opcode of the command to be executed. The SQE field may also include the command identifier, which may specify a unique identifier for the command when combined with a Submission Queue identifier. As also described above, a network transport unit may also include the total number of segments in the corresponding data block (e.g., write command with associated data). If the data block is for an RDMA write operation in response to a read command, the network transport unit may not include the total number of segments in the corresponding data block, as the entity that issues the read command may know the total number of segments it expects to receive and have allocated a memory space for the expected segments when it issues the read command.

At block 1120, after receiving the first network transport unit, the remote system may receive a second network transport unit from the host system, for example, through a second network path (or a second network port) different from the first network path (or the first network port). The second network transport unit may include a second segment of the data block, the same command identifier as in the first network transport unit, and a second segment identifier associated with the second segment. The second segment identifier and the first segment identifier may be 0-based, and may indicate that the second segment is before the first segment in a write command with associated data. For example, the first segment identifier may be 10 (e.g., the 11th segment), while the second segment identifier may be 0 (i.e., the first segment).

At block 1130, the remote system may determine whether all segments associated with the data block have been received, for example, based on the total number of segments in the corresponding data block if the command is a write command, and reassemble the data block based on the segments and segment identifiers in the network transport units. In the reassembled data block, the segments may be in an order same as the order of the segments in the original data block (e.g., write command with associated data) before it is sent to the remote system. For example, in the reassembled data block, the second segment may be before the first segment.

At block 1140, the remote system may process the reassembled data block and/or the command. For example, the remote system may determine whether the command is valid. If the command is valid, the remote system may perform the command, such as, for example, writing data to the remote system when the received command is a write command.

Optionally, at block 1150, the remote system may send to the host system a response indicating a status of the processing of the data block and/or command. For example, an NVMf response capsule may be sent to indicate that the command has been successfully completed. As described above, a response capsule may include a CQE and may optionally include data. The CQE field in the response capsule may include a CID that indicates the identifier of the command that is being completed. The CQE field may also include a Status Field (SF) that indicates the status of the command that is being completed.

Even though FIGS. 10 and 11 describes example methods as sequential operations, some of the operations may be performed in parallel or concurrently. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 12:
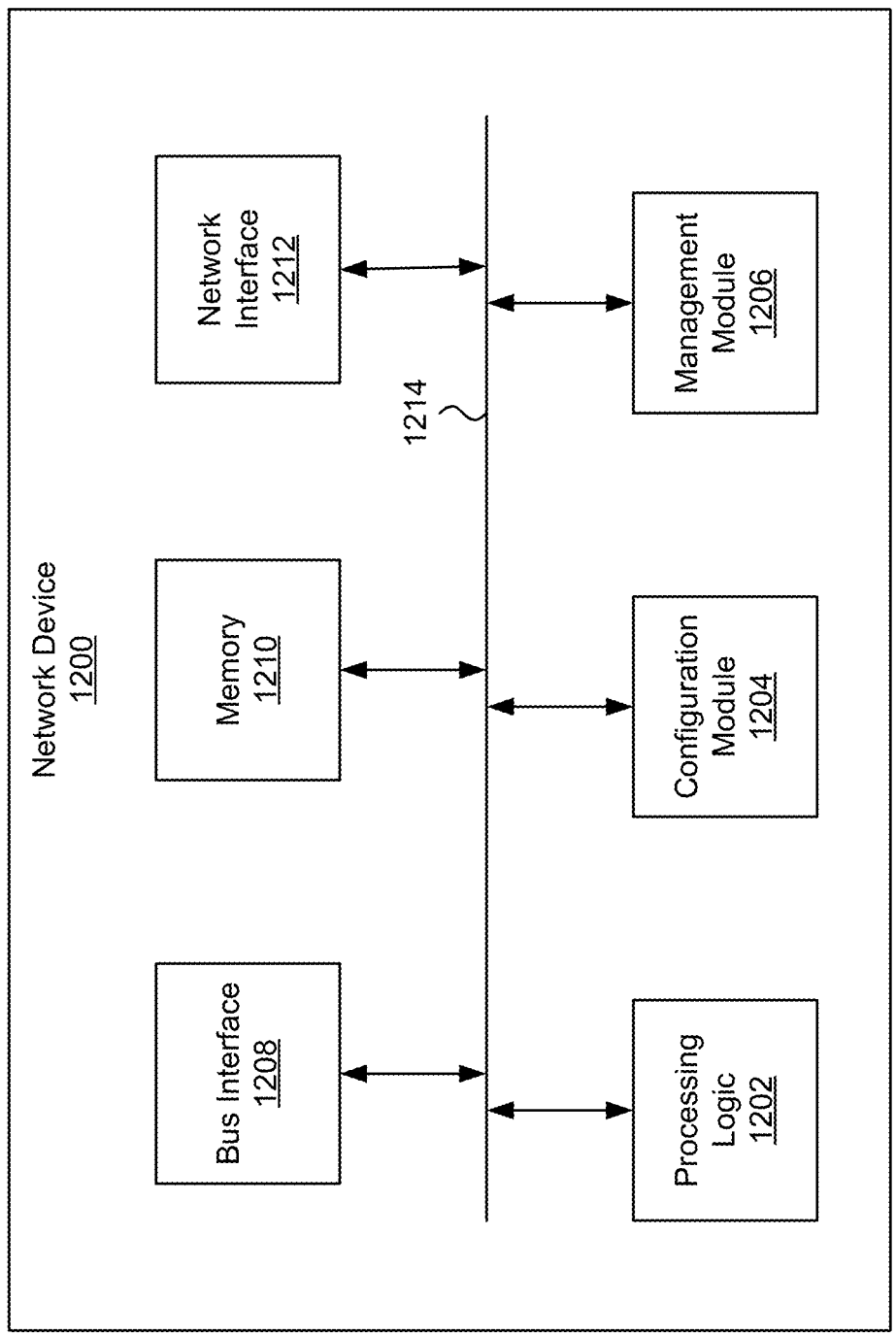
FIG. 12 illustrates an example of a network device, according to certain aspects of the disclosure.

FIG. 12 illustrates an example of a network device 1200. Functionality and/or several components of the network device 1200 may be used without limitation with other embodiments disclosed elsewhere in this disclosure, without limitations. A network device 1200 may facilitate processing of packets and/or forwarding of packets from the network device 1200 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1200 may be the recipient and/or generator of packets. In some implementations, the network device 1200 may modify the contents of the packet before forwarding the packet to another device. The network device 1200 may be a peripheral device coupled to another computer device, a switch, a router or any other suitable device enabled for receiving and forwarding packets.

In one example, the network device 1200 may include processing logic 1202, a configuration module 1204, a management module 1206, a bus interface module 1208, memory 1210, and a network interface module 1212. These modules may be hardware modules, software modules, or a combination of hardware and software. In certain instances, modules may be interchangeably used with components or engines, without deviating from the scope of the disclosure. The network device 1200 may include additional modules, not illustrated here, such as components discussed with respect to the nodes disclosed in FIG. 13. In some implementations, the network device 1200 may include fewer modules. In some implementations, one or more of the modules may be combined into one module. One or more of the modules may be in communication with each other over a communication channel 1214. The communication channel 1214 may include one or more busses, meshes, matrices, fabrics, a combination of these communication channels, or some other suitable communication channel.

The processing logic 1202 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1202 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1210.

The memory 1210 may include either volatile or non-volatile, or both volatile and non-volatile types of memory. The memory 1210 may, for example, include random access memory (RAM), read only memory (ROM), Electrically Erasable Programmable Read-Only Memory (EEPROM), flash memory, and/or some other suitable storage media. In some cases, some or all of the memory 1210 may be internal to the network device 1200, while in other cases some or all of the memory may be external to the network device 1200. The memory 1210 may store an operating system comprising executable instructions that, when executed by the processing logic 1202, provides the execution environment for executing instructions providing networking functionality for the network device 1200. The memory may also store and maintain several data structures and routing tables for facilitating the functionality of the network device 1200.

In some implementations, the configuration module 1204 may include one or more configuration registers. Configuration registers may control the operations of the network device 1200. In some implementations, one or more bits in the configuration register can represent certain capabilities of the network device 1200. Configuration registers may be programmed by instructions executing in the processing logic 1202, and/or by an external entity, such as a host device, an operating system executing on a host device, and/or a remote device. The configuration module 1204 may further include hardware and/or software that control the operations of the network device 1200.

In some implementations, the management module 1206 may be configured to manage different components of the network device 1200. In some cases, the management module 1206 may configure one or more bits in one or more configuration registers at power up, to enable or disable certain capabilities of the network device 1200. In certain implementations, the management module 1206 may use processing resources from the processing logic 1202. In other implementations, the management module 1206 may have processing logic similar to the processing logic 1202, but segmented away or implemented on a different power plane than the processing logic 1202.

The bus interface module 1208 may enable communication with external entities, such as a host device and/or other components in a computing system, over an external communication medium. The bus interface module 1208 may include a physical interface for connecting to a cable, socket, port, or other connection to the external communication medium. The bus interface module 1208 may further include hardware and/or software to manage incoming and outgoing transactions. The bus interface module 1208 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1208 may include the physical layer for any of these bus protocols, including a connector, power management, and error handling, among other things. In some implementations, the network device 1200 may include multiple bus interface modules for communicating with multiple external entities. These multiple bus interface modules may implement the same local bus protocol, different local bus protocols, or a combination of the same and different bus protocols.

The network interface module 1212 may include hardware and/or software for communicating with a network. This network interface module 1212 may, for example, include physical connectors or physical ports for wired connection to a network, and/or antennas for wireless communication to a network. The network interface module 1212 may further include hardware and/or software configured to implement a network protocol stack. The network interface module 1212 may communicate with the network using a network protocol, such as for example TCP/IP, InfiniBand, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1200 may include multiple network interface modules, each configured to communicate with a different network. For example, in these implementations, the network device 1200 may include a network interface module for communicating with a wired Ethernet network, a wireless 802.11 network, a cellular network, an InfiniBand network, etc.

The various components and modules of the network device 1200, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 13.

Figure 13:
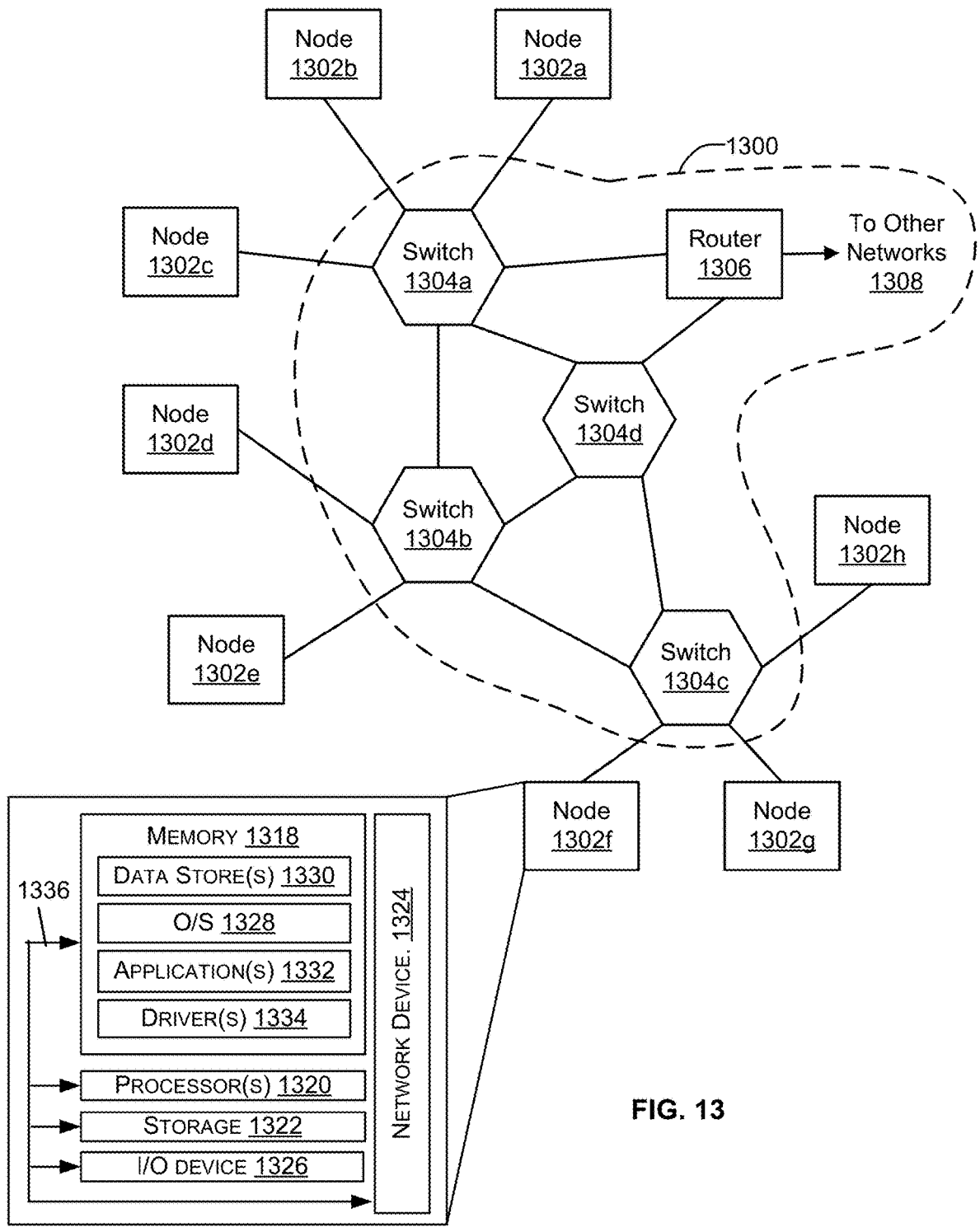
FIG. 13 illustrates an example architecture for features and systems described herein that includes one or more service provider computers and/or a user device connected via one or more networks, according to certain aspects of the disclosure.

FIG. 13 illustrates a network 1300, illustrating various different types of network devices 1200 of FIG. 12, such as nodes comprising the network device, switches and routers. In certain embodiments, the network 1300 may be based on a switched architecture with point-to-point links. As illustrated in FIG. 13, the network 1300 includes a plurality of switches 1304a-1304d, which may be arranged in a network. In some cases, the switches are arranged in a multi-layered network, such as a Clos network. A network device 1200 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1304a-1304d may be connected to a plurality of nodes 1302a-1302h and provide multiple paths between any two nodes.

The network 1300 may also include one or more network devices 1200 for connection with other networks 1308, such as other subnets, LANs, wide area networks (WANs), or the Internet, and may be referred to as routers 1306. Routers use headers and forwarding tables to determine the best path for forwarding the packets, and use protocols such as internet control message protocol (ICMP) to communicate with each other and configure the best route between any two devices.

In some examples, network(s) 1300 may include any one or a combination of many different types of networks, such as cable networks, the Internet, wireless networks, cellular networks and other private and/or public networks. Interconnected switches 1304a-1304d and router 1306, if present, may be referred to as a switch fabric, a fabric, a network fabric, or simply a network. In the context of a computer network, terms "fabric" and "network" may be used interchangeably herein.

Nodes 1302a-1302h may be any combination of host systems, processor nodes, storage subsystems, and I/O chassis that represent user devices, service provider computers or third party computers.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device(s) may be part of the distributed system managed by, controlled by, or otherwise part of the service provider computer(s) (e.g., a console device integrated with the service provider computers).

The node(s) of FIG. 13 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302a-1302h may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302a-1302h, the memory 1318 may be volatile (such as RAM) and/or non-volatile (such as ROM, flash memory, etc.). The memory 1318 may include an operating system 1328, one or more data stores 1330, one or more applications 1332, one or more drivers 1334, and/or services for implementing the features disclosed herein.

The operating system 1328 may support nodes 1302a-1302h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix®, Linux®, Windows®, macOS®, iOS®, Android™ and the like. The operating system 1328 may also be a proprietary operating system.

The data stores 1330 may include permanent or transitory data used and/or operated on by the operating system 1328, application(s) 1332, or drivers 1334. Examples of such data include web pages, video data, audio data, images, user data, and so on. The information in the data stores 1330 may, in some implementations, be provided over the network(s) 1308 to user devices 1304. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between applications 1332 and the operating system 1328, and/or applications 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302a-1302h or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302a-1302h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302a-1302h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302a-1302h may also include I/O device(s) 1326, such as a keyboard, a mouse, a pen, a voice input device, a touch input device, a display, speakers, a printer, and the like. The node(s) 1302a-1302h may also include one or more communication channels 1336. A communication channel 1336 may provide a medium over which the various components of the node(s) 1302a-1302h can communicate. The communication channel or channels 1336 may take the form of a bus, a ring, a switching fabric, or a network.

The node(s) 1302a-1302h may also contain network device(s) 1324 that allow the node(s) 1302a-1302h to communicate with a stored database, another computing device or server, user terminals and/or other devices on the network(s) 1300. The network device(s) 1324 of FIG. 13 may include similar components discussed with reference to the network device 1200 of FIG. 12.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1208 may implement NVMe, and the network device 1324 may be connected to a computing system using a PCIe interface.

A PCI-based device may include one or more functions. A "function" describes operations that may be provided by the network device 1324. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1324 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, FIG. 13, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A data communication system, comprising:
a host system and a remote system,
wherein the host system comprises a host processing unit and a host computer-readable storage medium storing instructions that, when executed by the host processing unit, cause the host processing unit to:
receive a command with associated data to be transmitted between the host system and the remote system;
split the command with associated data into a first and a second segments, each of the first and second segments associated with a corresponding segment identifier;
encapsulate the first and the second segments;
generate a first network transport unit prior to submitting the command with associated data for transmission, the first network transport unit comprising:
the encapsulated first segment;
a command identifier for the command;
a first segment identifier; and
a field indicating a total number of segments in the command;
generate a second network transport unit prior to submitting the command with associated data for transmission, the second network transport unit comprising:
the encapsulated second segment;
the command identifier for the command;
a second segment identifier, wherein the second segment identifier and the first segment identifier indicate that the first segment is before the second segment in the command with associated data; and
the field indicating the total number of segments in the command; and
submit the first and second network transport units for transmission between the host system and the remote system by assigning the first network transport unit to a first flowlet for transmission on a first network path and assigning the second network transport unit to a second flowlet for transmission on a second network path different from the first network path; and
wherein the remote system comprises a remote processing unit and a remote computer-readable storage medium storing instructions that, when executed by the remote processing unit, cause the remote processing unit to:
receive the second network transport unit from the host system;
prior to receiving the first network transport unit, allocate memory space on the remote system based on the total number of segments in the command;
receive, subsequent to receiving the second network transport unit, the first network transport unit from the host system; and
reassemble the command with associated data based on the first segment and the second segment, wherein the first segment is before the second segment in the reassembled command with associated data.

2. The data communication system of claim 1, wherein the instructions stored on the host computer-readable storage medium and the remote computer-readable storage medium further cause the host processing unit and the remote processing unit to:
establish a first transport session between the host system and the remote system;
associate a controller with the first transport session; and
associate a first endpoint number for a first queue with the first transport session,
wherein the command is submitted to the first queue; and wherein the first and the second network transport units each include information indicating the first endpoint number associated with the first transport session.

3. The data communication system of claim 2, further comprising:
establish a second transport session between the host system and the remote system;
associate the controller with the second transport session; and
associate a second endpoint number for a second queue with the second transport session, the second endpoint number different from the first endpoint number.

4. The data communication system of claim 1, wherein the first network transport unit and the second network transport unit are transmitted to the remote system through different network ports.

5. A computer-implemented method for transferring data between a host system and a remote system over a network, the method comprising:
receiving a command with associated data to be transmitted between the host system and the remote system;
dividing the command with associated data into a plurality of segments including a first and a second segments, each of the first and second segments associated with a corresponding segment identifier used for determining an order of the plurality of segments when reassembling the plurality of segments;
encapsulating the first and second segments;
generating a first network transport unit prior to submitting the command with associated data for transmission, the first network transport unit comprising:
the encapsulated first segment;
a first segment identifier; and
a field indicating a total number of segments in the command;
generating a second network transport unit prior to submitting the command with associated data for transmission, the second network transport unit comprising:
the encapsulated second segment;
a second segment identifier; and
the field indicating the total number of segments in the command, wherein the remote system allocates memory space based on the total number of segments in the command upon receiving the second network transport unit and prior to receiving the first network transport unit; and
submitting the first and second network transport units for transmission between the host system and the remote system by assigning the first network transport unit to a first flowlet for transmission on a first network path and assigning the second network transport unit to a second flowlet for transmission on a second network path different from the first network path.

6. The computer-implemented method of claim 5, wherein each of the first and second network transport units comprises an immediate header field that includes the corresponding segment identifier associated with the encapsulated first or second segment.

7. The computer-implemented method of claim 6, wherein the immediate header field further comprises a command identifier associated with the command, the command identifier identifying the command in a queue of commands.

8. The computer-implemented method of claim 5, wherein the command with associated data includes a write command and associated data to be written to the remote system.

9. The computer-implemented method of claim 5, wherein the command with associated data is placed in a submission queue.

10. The computer-implemented method of claim 5, wherein the command includes a Non-Volatile Memory Express (NVMe) over Fabrics (NVMf) command.

11. The computer-implemented method of claim 5, wherein the first and the second network transport units include information indicating a unique transport session.

12. A computer-implemented method, comprising:
receiving a first network transport unit, wherein the first network transport unit comprises:
a first segment of a data block;
a command identifier associated with a command;
a first segment identifier; and
a field indicating a total number of segments in the command;
allocating memory space based on the total number of segments in the command;
after receiving the first network transport unit and allocating the memory space, receiving a second network transport unit, wherein the second network transport unit comprises:
a second segment of the data block;
the command identifier;
a second segment identifier, wherein the second segment identifier and the first segment identifier indicate that the second segment is before the first segment in the data block; and
the field indicating the total number of segments in the command; and
reassembling the data block based on the first segment and the second segment, wherein the second segment is before the first segment in the reassembled data block
wherein the first and second network transport units are generated by a host system prior to submitting the command with associated data for transmission by assigning the first network transport unit to a first flowlet for transmission on a first network path and assigning the second network transport unit to a second flowlet for transmission on a second network path different from the first network path.

13. The computer-implemented method of claim 12, wherein:
receiving the first network transport unit comprises receiving the first network transport unit through the first network path; and
receiving the second network transport unit comprises receiving the second network transport unit through the second network path.

14. The computer-implemented method of claim 12, wherein
receiving the first network transport unit comprises receiving the first network transport unit from a first network port; and
receiving the second network transport unit comprises receiving the second network transport unit from a second network port different from the first network port.

15. The computer-implemented method of claim 12, wherein the command is a Non-Volatile Memory Express (NVMe) over Fabrics (NVMf) write command.

16. The computer-implemented method of claim 12, further comprising:
receiving a plurality of network transport units; and
reducing a number of received but unprocessed network transport units by:

requesting data be sent through a remote direct memory access (RDMA) protocol;

sending a message indicating an amount of free space in a buffer for a transport session;

sending a message indicating that an amount of free memory space is low; or dropping at least some received but unprocessed network transport units.

17. The computer-implemented method of claim 12, further comprising:

allocating a memory space; and sending a read command, the read command requesting a remote direct memory access (RDMA) write to the allocated memory space, wherein:

the first and second network transport units are transmitted in response to the read command; and the data block corresponds to data requested by the read command.

\* \* \* \* \*